United States Patent [19]

Michaelis et al.

[11] 3,801,774

[45] Apr. 2, 1974

[54] APPARATUS FOR AUTOMATIC PROCESSING OF DATA

[75] Inventors: Heinz Michaelis, Bielefeld; Gerhard Rethmeier, Dentrup; Fritz Schmieder, Bielefeld, all of Germany

[73] Assignee: Anker-Werke AG, Bielefeld, Germany

[22] Filed: Mar. 1, 1971

[21] Appl. No.: 119,897

Related U.S. Application Data

[63] Continuation of Ser. No. 629,305, April 7, 1969, abandoned.

[30] Foreign Application Priority Data

Apr. 9, 1966 Germany.............................. 52126

[52] U.S. Cl............................ 235/61.6 R, 235/61.1
[51] Int. Cl............................ G06k 1/00, G06k 1/20
[58] Field of Search..... 235/61.6 R, 61.6 A, 61.9 R, 235/61.1; 186/1; 101/66; 283/55; 355/14

[56] References Cited
UNITED STATES PATENTS

| | | | |
|---|---|---|---|
| 3,035,764 | 5/1962 | Beman............................. | 235/61.1 |
| 3,099,944 | 8/1963 | Eichorn et al...................... | 355/14 |
| 2,991,710 | 7/1961 | Harwood........................... | 101/66 |
| 3,122,995 | 3/1964 | Adler et al......................... | 101/66 |

Primary Examiner—Thomas J. Sloyan
Attorney, Agent, or Firm—Herbert L. Lerner

[57] ABSTRACT

Method of producing an automatically processable data carrier marked with different items of information wherein before introducing data of a specific business transaction such as merchandise purchasing, merchandise receipt with simultaneous price items marking, and merchandise sale, into a business machine, the data carrier is marked by suitable control and adjusting mechanisms of the business machine for one of the specific business operations with control characteristics comprising heading data relating to the respective business transaction of the information group to be marked thereon, voucher or receipt constants relating to individual subgroups of the information group, and supplemental constants for differentiating the subgroups, and thereafter marking the data carrier with numerical information relating to the respective business transaction.

Apparatus for carrying out the method including a business machine having adjusting means for introducing the numerical information coordinated with the heading data, the voucher or receipt constants and the supplemental constants, control keys for releasing and controlling selective machine runs to introduce control data, the control keys having control means acting upon corresponding control means of a tape perforating device of the like additionally characterizing the respective data groups.

4 Claims, 16 Drawing Figures

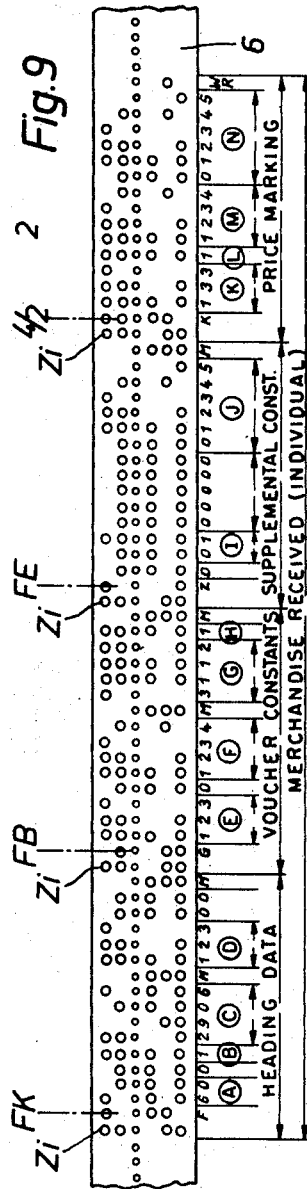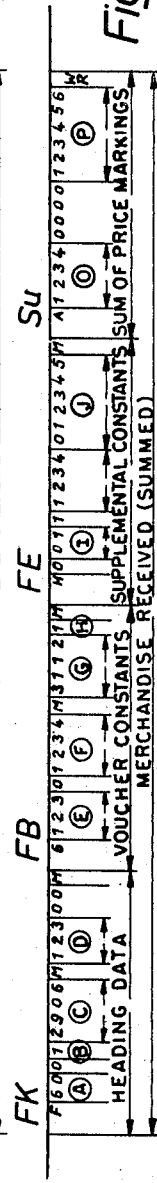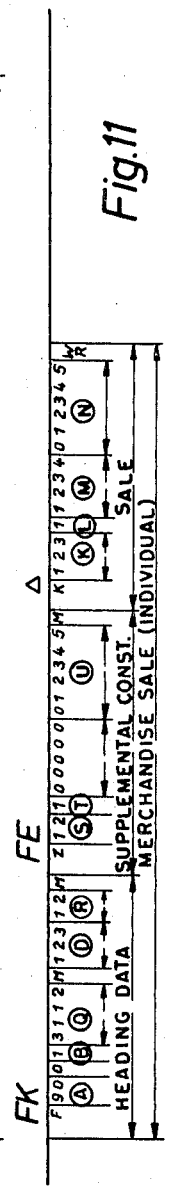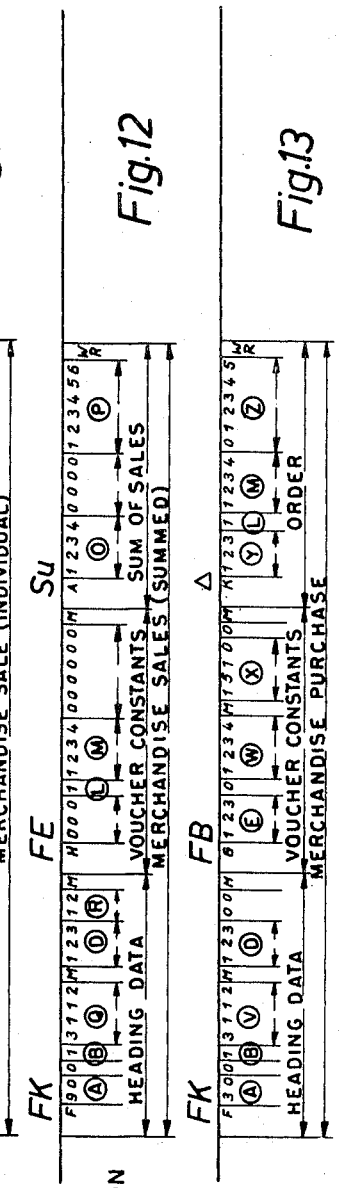

APPARATUS FOR AUTOMATIC PROCESSING OF DATA

This is a continuation of application Ser. No. 629,305 filed Apr. 7, 1969 and now abandoned.

Our invention relates to a method and apparatus for automatic processing of data, more particularly, by utilizing a business or accounting machine connected to a tape-perforating or hole-punching device.

Short period profit accounting as well as the statistics relating to the types and quantities of merchandise in a retail business depend upon the actual numerical level of the business transactions which forms the foundation for correctly made business decisions and assures continuous adjustment to rapid changes in trade or the like. To determine the incident movement of merchandise for the purpose of subsequent automatic processing, while business is being carried on, cash registers are used that are connected to tape-perforating or hole-punching devices such as are described for example in the German Published Application No. 1,053,828. The perforated strips of tape, however, have sufficient information content only if other characteristics or criteria of the sold merchandise besides the selling price thereof are posted in the cash register and accordingly punched in the tape, which is very laborious and considerably delays the computing operations. Instead of employing perforated strips as data carriers, it has also been known to mark journal entry strips or checking or control strips with characters that are readable by machine and to feed them to a central data processing installation for evaluation. Furthermore, in U.S. Pat. No. 3,035,764 to W. W. Beman there is disclosed a method and apparatus for determining sales data, wherein a tag reading mechanism adapted to read price information from different types of merchandise identification tags and a tape perforator are coordinated with a cash register and are so controlled that the selling price and additional data essential for subsequent evaluation can be introduced into the tape perforator both by the tag reading mechanism and the cash register.

With the heretofore mentioned methods and apparatus for determining the merchandise data it is always necessary to mark the price beforehand. In order to eliminate during the pricemarking operation all conceivable sources of error in advance at the point of origin of the data for the sale, a controlled price-marking has been recently proposed wherein the marking machine produces vouchers or receipts in the form of special control strips or perforated tapes which are readable by machine.

It is an object of our invention to provide method and apparatus for automatic processing of data which affords considerable improvement over the aforementioned heretofore known devices.

It is another object of our invention to provide such method and apparatus wherein data of the merchandise purchase or order as well as data of the merchandise sale is automatically processed in addition to the data relating to the price-marking or the receipt of the merchandise to permit the merchant to use the entire range of electronic data processing for the operation of his business.

It is a further object of our invention to provide such method and apparatus as will permit the data incident to merchandise receipt, merchandise order and merchandise sale to be marked on one and the same automatically processable data carrier.

With the foregoing and other objects in view, we provide in accordance with our invention, method of producing automatically processable data carrier marked with different items of information which comprises, before introducing data of a specific business transaction, including merchandise purchase, merchandise receipt with simultaneous price-marking amd merchandise sale, into a business or accounting machine, marking the data carrier by means of suitable control and adjusting mechanisms of the business machine for one of said specific business operations with control characters comprising heading data relating to the respective business transaction of the information group to be marked thereon, voucher or receipt constants relating to individual subgroups of the information group, and supplemental constants for differentiating the subgroups, and thereafter marking the data carrier with numerical information relating to the respective business transaction.

According to a further feature of our invention, the method comprises marking on the data carrier the numerical items of information originating from different types of merchandise after the heading data, the voucher constants and the supplementary constants are successively marked thereon, and marking in consolidated form as sums thereon the items of information appearing thereon from the same types of merchandise after the respective heading data, receipt constants and supplementary constants have been successively marked thereon.

In accordance with our invention, the apparatus for carrying out the method of the invention comprises a business machine having adjusting means for introducing the numerical information coordinated with the heading data, the voucher receipt constants and the supplemental constants, control keys for releasing and controlling selective machine runs to introduce control data, the control keys having control means acting upon corresponding control means of a tape-perforating device or the like for additionally characterizing the respective data groups.

In accordance with a further feature of our invention, the business machine has control means for marking items of control information on the data carrier, control means for controlling machine runs for producing different markings, control means for controlling machine runs for amounts introduced, control means for computing account sums as well as control means for selectively switching over the tape-perforating device to individual marking of business operations and to marking of sums that are computed for similar business operations by the business machine proper or a coordinated cash register or the like.

Other features which are considered as characteristic for the invention are set forth in the appended claims.

Although the invention is illustrated and described herein as method and apparatus for automatic processing of data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 9–13 are various examples of information marking on perforated tape;

Figure 1:
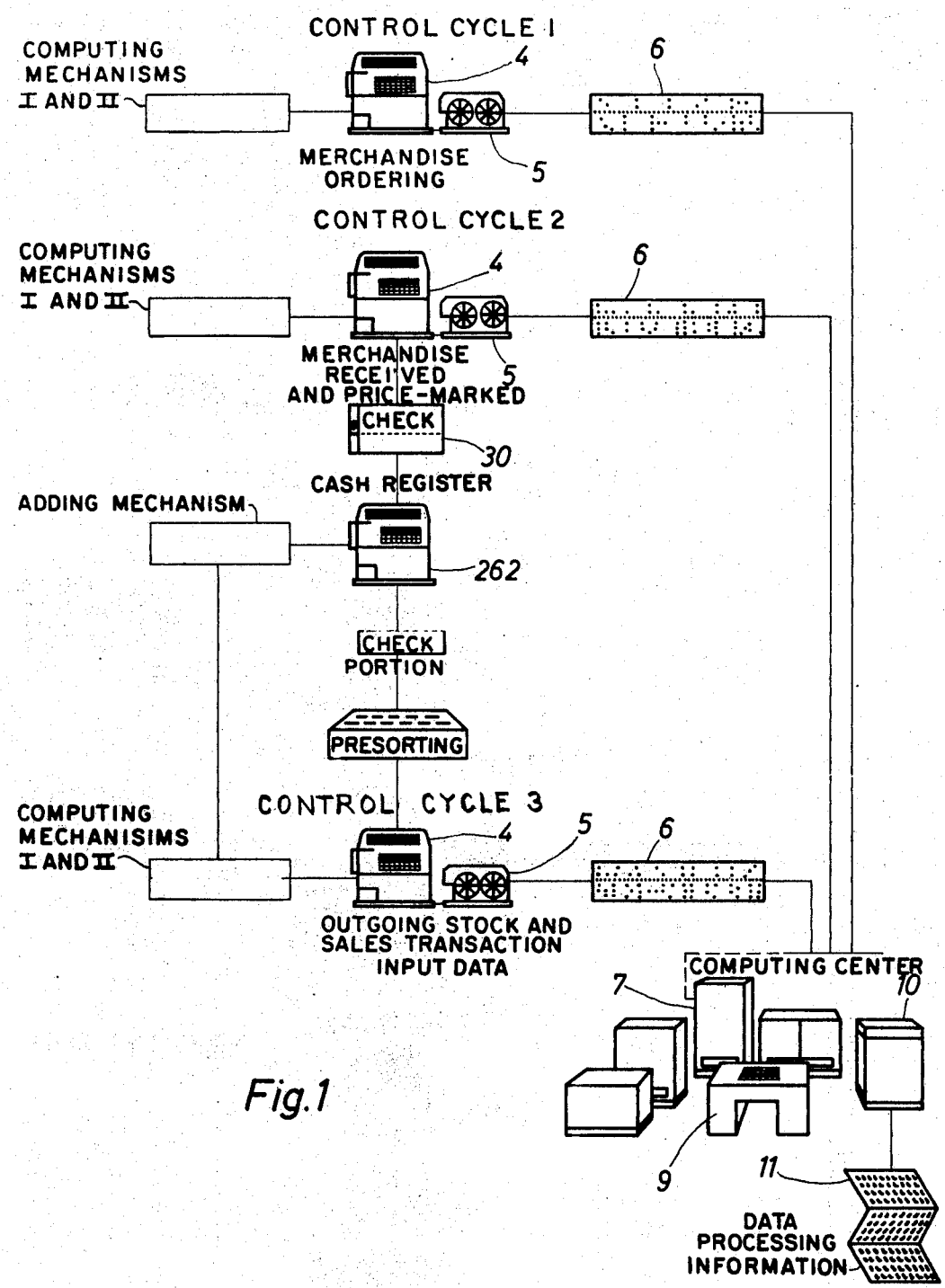
FIG. 1 is a schematic view of apparatus for automatically controlled processing of data in accordance with our invention.

Referring now to the drawings and first particularly to FIG. 1 thereof, there is schematically shown apparatus for carrying out the hereinafter described method for controllably processing or determining data capable of evaluation by machine, comprising independent business transactions represented as control cycles 1, 2 and 3 which include merchandise ordering, merchandise purchasing and merchandise selling. In the control cycle 1, the data relating to merchandise ordering is determined, is introduced into the business or accounting machine 4, which has the construction of a multipurpose machine, and transferred to the perforated tape 6 by means of a hole punching device 5 of conventional construction. The control cycle 2 serves for determining all data relating to the marking of received merchandise, and the control cycle 3 for determining data to be registered during the sales transactions. The punch hole tape 6 is marked in a hereinafter described manner to distinguish the individual groups of data and can be fed to a device 7 for reading the punch hole tape for evaluation or interpretation thereof. The readable data is then introduced by the reading device 8 into an electronic data processing device 9 (computing center) which produces the required information on an output sheet 11 by means of a suitably provided printing device 10.

The accounting machine 4 (FIG. 2) constructed as a multi-purpose machine in accordance with the invention, with the tape-perforating device 5 connected thereto, has a keyboard provided with a bank 12 of control keys 13 to 21 for controlling the machine runs that are to be produced for the various different registering operations. The control key 13 serves for introducing fixed or nonvarying heading or title data such as the merchant's name, for example, the control key 14 for fixed voucher or receipt data such as the identification number thereof, the control key 15 for fixed supplemental data, the control keys 16 and 17 for producing fourfold or quadruple tickets, the control key 18 for producing twofold or double tickets, the control key 19 to release machine runs for introducing amounts, and the control keys 20 and 21 to release machine runs for summing and totalizing. Adjacent the control key bank 12 there are five rows 22 of amount keys 23 for introducing amounts, and four additional rows 24 of value keys 25 for the introduction of article numbers such as style or type numbers or the like. The adjusting levers 26–28 serve for introducing the size, weight or quantity of articles and the adjusting lever 29 for introducing the stock item number. In order to be able to effect additional individual entries on the check or ticket 30 (FIG. 1) to be produced, four coaxially mounted adjusting wheels 32 to 35 are provided on the side wall 31 of the accounting machine 4 which, for example, serve for marking on the check 30 the supplier's bill number and the month in which the merchandise was received. In addition, the accounting machine 4 is provided with a counter 36, a program switch 37 and an advance counter 39, 40 released by the lever 38. Two lamps 41, 42 are coordinated with the program switch lever 37 indicating the upper and lower position thereof. The machine is furthermore provided with a voucher or receipt insertion device 43 in which single tickets, bills, receipts and the like can be inserted so as to be suitably marked or receipted, and is also provided with a control strip 44 as well as an issuing device 45 by means of which the tickets 30 that are produced are mechanically ejected. The clearing lever 46 serves for releasing any incorrectly adjusted or depressed keys. The amount and value keys 23 and 25 located in the key bank 47 (FIG. 3) cooperate in a conventional manner with arresting and blocking sliders 49 and 50 as well as with a differential mechanism slider 51 which is connected by means of a link 52 with a feeler or sensing lever 53 of the differential mechanism 54 whose construction and performance are generally known (U.S. Pat. Nos. 3,066,861 and 3,076,595). A pull rod 55 is linked to the sensing lever 53 and serves for adjusting the adjusting segment 56. The adjusting segment 56 is operatively connected by a rod 57 with two other adjusting segments 58 and 59. The adjusting segments 56, 58 and 59, provided with peripheral teeth, are brought into engagement with the associated adding or totalizing mechanisms 60 to 63 for transferring values or subtracting values by means of the non-illustrated computing mechanism selecting device described in U.S. Pat. No. 3,301,478 to G. Becker. The adding mechanism 60 is selected by the control keys 17, 18, 19 and 20, and the adding (totalizing) mechanism 61 is selected by the control keys 17, 18, 19 and 21. The control keys 13 to 16 are not associated with any computing mechanism selecting means. As afore-mentioned, for a more detailed description of the adding and totalizing mechanisms 60 to 63, reference may be had to U.S. Pat. No. 3,301,478.

A link 64 is furthermore pivotally attached to the differential mechanism 54 for driving gear segment 65. An extension 66 is provided on the linkage 64 and carries a pin 67 engaging in the contact arm 68 of a rotary selector switch 69 provided with contacts 70 described hereinafter in greater detail.

The drive for the differential mechanism 54 coordinated with the individual decades is provided by a respective pair of cam discs 72, 73 secured to the main shaft 71 of the accounting machine by means of non-illustrated follower members in a conventional manner.

The control keys 13 to 21 (FIG. 4) located in the control key bank 12 cooperate with a stop or arresting slider 75 and control and blocking sliders (FIG. 5) still to be described hereinafter, as well as with a differential mechanism slider 76, which is connected by means of the linkage 77 with the feeler or of the differential mechanism 79 coordinated with the control key bank 12. A rod 80 is furthermore linked to the sensing lever 78 and is connected with a reversing segment 82 mounted on a pin 81 fixed to the machine housing. Another rod 83 is linked to the reversing segment 82 and is pivotally suspended on the pin 84 of the gear segment 85. The gear segment 85 meshes with a pinion 86 which drives the aforementioned non-illustrated automatic adding mechanism selecting device and also meshes with a gear 87 which is rotatably mounted on a shaft 88. The gear 87 is riveted to a cam disc 89 having a cam profile 90 cooperating with a feeler pin or follower 91. The feeler pin 91 is riveted or otherwise secured to a feeler lever 92 which is pivotably mounted on a pin 93 fixed to the machine housing and is provided with a further pivot pin 94 to which a tension spring 95 as well as a link 96 are secured. The link 96 is connected with a square connecting pin 97 extending through a lever 108 mounted on a pin 98. The connecting pin 97 cooperates with actuating levers 100, 101, 102 rotatably mounted one behind the other on a fixed pin 99. Feeler rollers or followers 103, 104 of the actuating levers are influenced or affected by the cam disc pairs 105, 106, 107 which are secured to the main shaft 71 of the accounting machine. The cam disc pairs 105, 106, 107 respectively produce the movements necessary for controlling the operating modes: addition, subtotalizing and final totalizing machine runs. These movements are transferred to the bell crank 109 rotatably mounted on the fixed pin 99, which acts through non-illustrated follower members on the non-illustrated mode control rails of conventional type, by means of which the adding or totalizing mechanisms 60 to 63 (FIG. 3) are meshed with the gear segments 56, 58, 59 in the rhythm of the selected operating mode. Reference can be had to U.S. Pat. No. 3,301,478 for a more detailed description of the foregoing automatic mode control device.

Figure 6:
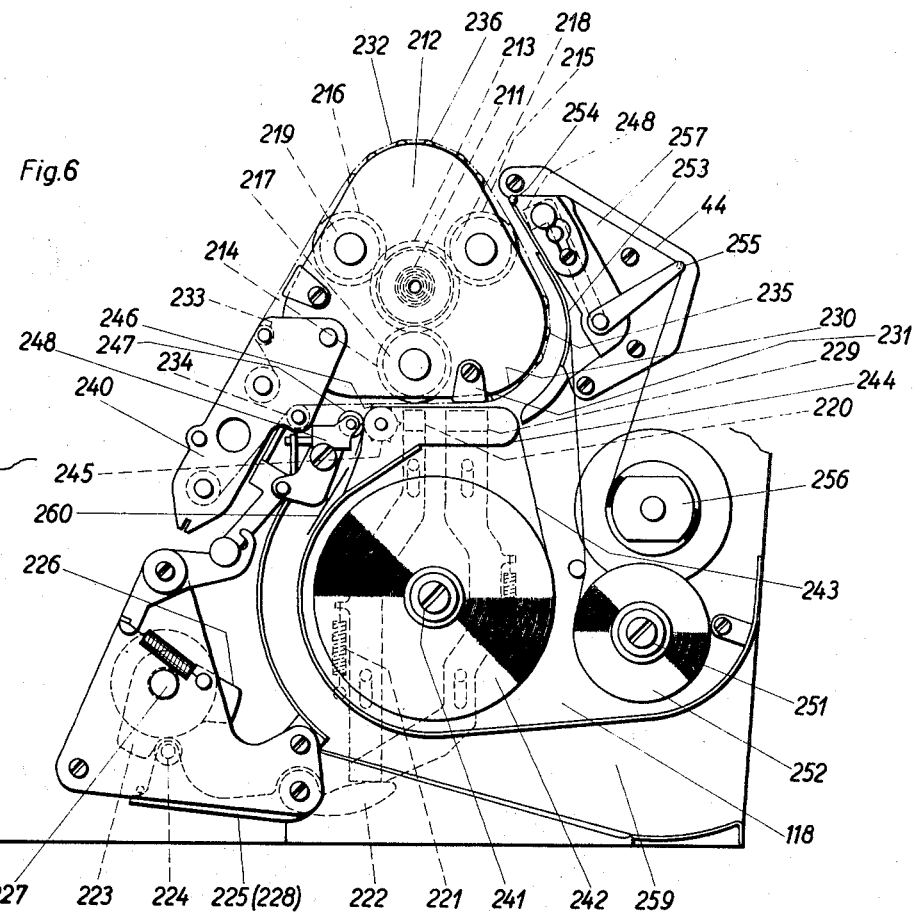
FIG. 6 is a side view of the printing mechanism of the business machine of FIG. 2.

A link 111 having an angle formed therein is furthermore secured to the gear segment 110 of the differential mechanism and is provided with a projection 112 to which a pin 113 is riveted or otherwise secured, and operatively or drivingly connected with a contact arm 114 of a rotary selector 115. The gear segment 110 meshes with a gear 116 which is connected by a tubular shaft 117 with the printing mechanism 118 shown in FIG. 6.

The control keys 13 to 21 cooperate in accordance with the invention by means of their cross pins 120 with a control slider 121 (FIG. 5), an amount key blocking slider 122, zero pawl and releasing sliders 123, 124, the afore-mentioned stop or arresting slider 75 and with a specific operating sequence of the control slider 125 acting on the keys, which are guided in the pin and slot connections 126, 127 and 128, 129 in the control key bank 12. A pin 130 is riveted to the control slider 121 and a rod 131 is rotatably mounted thereon so as to act upon a non-illustrated releasing means which acts to clear the amount and value keys 23, 25, located in the depressed condition thereof, just before the end of the respective executed machine run. The control slider 121 can be shifted into active position towards the left as shown in FIG. 5 by the control keys 13, 14, 15 and 19, the cross pins 120 thereof cooperating with the respective control surfaces 134, 135, 136, 137. When actuating the control keys 16, 17, 18, no clearing of the adjusted amount and value keys 23 and 25 can take place because the control slider 121 is not actuated by these keys. A pin 138 is riveted to the amount blocking slider 122 and is engageable by a control pin 139 which is secured to the hollow shaft 140 (FIG. 4). The hollow shaft 140 is adjusted by means of the aforementioned blocking slider 50 coordinated with the key banks 47 (FIG. 3), the blocking slider 50 acting by means of the pins 141 on the amount blocking stops 142 which are secured to the hollow shaft 140.

If an amount key 23 or 25 is actuated in any key bank 47 (FIG. 3) and the coordinated blocking or obstructing slider 50 is thereby moved toward the right-hand side of the figure, the hollow shaft 140 is then turned counterclockwise and the control pin 139 (FIG. 5) draws the amount blocking slider 122 to the right-hand side as viewed in FIGS. 4 and 5, so that the cross pins 120 of the control keys 20 and 21 lie above the blocking surfaces 143 and 144 and therewith block both totalizing keys 20 and 21. The zero pawl and releasing slider 123, which is connected by means of a link 145 with a blocking segment 132 of the blocking mechanism 133, normally has no effect upon the control keys 13 to 17. The control keys 18 to 21, however, cooperate with the angularly inclined notches 146, 147, 148, 149, and the cross pins 120 of the keys 18 to 21 serve for transferring the zero pawl and releasing slider 123 to the operating position in which the zero pawl 151 (FIG. 4) is lifted out. The zero pawl and releasing slider 124, however, can be adjusted or shifted by any of the control keys except control key 18 which nevertheless is not blocked during the actuation of one of the other control keys because the cutout 152 is made so wide that the key pin 120 of control key 18 is freely movable. The zero pawl and releasing slider 124 is connected by a link 153 with the blocking mechanism 133.

The afore-mentioned stop slider 75 is provided with hook-shaped projections 154 serving to arrest or stop the depressed keys, and is additionally provided with two pins 155, 156 between which the releasing lever 157, which is secured to the releasing shaft 158, engages, releasing the arrested control keys 13 to 21 shortly before the end of the respective executed machine run.

Figure 7:
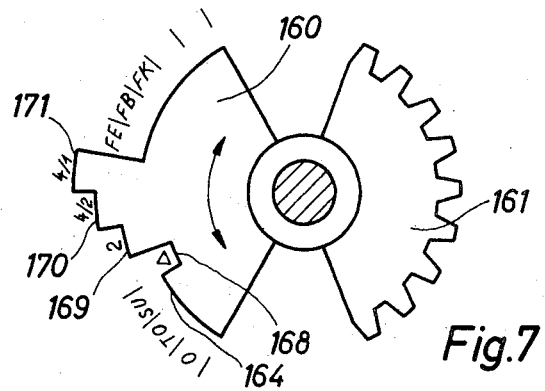
FIG. 7 is a schematic view of details of the device for blocking the control keys.

The adjustment of the control slider 125, provided for specific key operating sequences, is dependent upon a control disc 160 shown in FIG. 7 which is adjusted by the differential mechanism 79 coordinated with the control key bank 12 by means of a gear segment 161. A double-armed feeler or sensing member 162 is coordinated with the control disc 160, the feeler 163 proper thereof cooperating with the profile 164 and, by means of a control pin 165 of a control shaft 166, is raised during each machine run before adjustment of the control disc 160. A tension spring 167 fastened at one end to the control slider 125 holds the feeler 163 in contact engagement with the profile 164 after the clearance. The profile 164 of the control disc 160 is shaped in such a way that the control slider 125 releases or clears the control keys 13, 14, 15, 16, 18, 19, 20 and 21 in the normal position shown in FIG. 5, but blocks the control key 17. In the position determined by the recess 168 of the control disc 160, the control slider 125 adopts a position to the left-hand side of its position in FIG. 5, in which the control keys 14, 16, 17, 18 and 21 are blocked. The projection 169 guides the control slider 125 from the normal position of FIG. 5 over one control step, the projection 170 guides over two control steps and the projection 171 over three steps in a direction toward the right-hand side of FIG. 5. During the adjustment of a single control step toward the right-hand side of FIG. 5, the control keys 13, 14, 15, 19 and 21 are blocked by the corresponding profile portions 172 to 176 of the control slider 125. For two control steps, in addition to the control keys 13, 14, 15, 17, 19 and 21, the control key 18 is also blocked, and for three control steps, the control keys 13, 14, 15, 16, 18, 19, 20 and 21 are blocked and the heretofore blocked control key 17 is released or cleared. As is apparent from FIG. 5, the control slider 125 has suitably formed rectangular notches or cutouts 177/13 to 177/21, with an inverted U-shaped cutout 177/16 for the control key 16, which only permits actuation of the control key 16 in the normal position of the control slider 125, as shown in FIG. 5, and when two control steps have been taken by the slider 125 toward the right-hand side of FIG. 5.

The control of the known tape-perforating or hole-punching device 5 shown in FIG. 1 is effected by control means of the accounting machine 4. From a transformer 178 (FIG. 8) connected to an alternating current power line of 220 volts and a rectifier 179, a conductor 180 leads to switch contacts 181, 182 and 183 which are adjusted by control cams 184, 185 and 186 respectively of the tape-perforating device 5. The conductor 180 is furthermore connected with a control device 187, as well as with the programming switch 37 (FIGS. 2 and 8), the contacts 188, 189 of the switch 37 being connected with the contact pairs 190, 191. The contact pairs 190, 191 are adjusted by the cam disc NR of the main shaft 71 of the machine 4 and are connected by the conductors 192, 193 with the rotary selector 115 of the control key bank 12 whose contact arm 114 (FIG. 4) is divided in accordance with the invention into four insulated contact fingers I-IV (FIG. 8), whose associated contacts, as described hereinafter, are connected. The conductor 194/1 connected with the contacts of the contact fingers I, II, III leads to the relay Mo connected to the non-illustrated drive motor of the tape-perforating device 5 as well as to one terminal of the relay MK connected to a non-illustrated single-revolution clutch of conventional construction, the relay MK being connected at its other terminal to the neutral conductor 195. The control cam 184 switches the blocking magnet ST on when the tape-perforating device 5 is operated, the blocking magnet ST being thus actuated to block the control keys 13 to 21 of the accounting machine 4 against actuation thereof.

The conductors 194/2 to 194/7 lead to the switching relays 196 FK, 196 FB, 196 FE/1, 196 FE/2, 196 Δ, 196 SU, whose contacts 197/M17, 197/M11, 197/M10, 197/M2 are connected by non-illustrated conductors. The rotary selector 69 coordinated with the rows 22 and 24 of keys as well as with the adjusting levers 26 to 29, and the connections thereof are illustrated for the value position "4". The afore-mentioned switch contact 183 is connected through the conductor 199 with the contact arm 200 of a current divider 201 of the tape-perforating device 5 whose contact E is connected by means of the conductor 202 to all of the contacts 69/E of the rotary selector 69 of the accounting machine 4. The rotary selector 69/S is connected through a conductor 203 with the magnet 195/S, which is connected at its outlet side in turn to the neutral conductor 195. The contacts 197/A, B, C, D, F, H, J, K, M are connected with the contacts A, B, C, D, F, H, J, K, M of the current divider 201 and the contacts 197 T with the contact arm 68 of the rotary selector 69/T of the accounting machine 4.

The contact arm 200 is driven by the shaft 204 of the tape-perforating device 5 which is displaced by a non-illustrated drive motor by means of a crank-drive for every succeeding machine run through an angle of about 180° and in a counterclockwise direction whereby the gear 205 secured to the shaft 204 suitably adjusts the gear rod 206 which follows the spring-loaded control rail 207 whose control teeth 208 select the schematically shown hole puncher 209. The control rail 207 cooperates with a control pawl 210 which is adjusted by the magnets 198/S.

A corresponding gear 205, a gear rod 206, a control rail 207 as well as a control pawl 210 is coordinated with each value position of the tape-perforating device 5.

Figure 8:
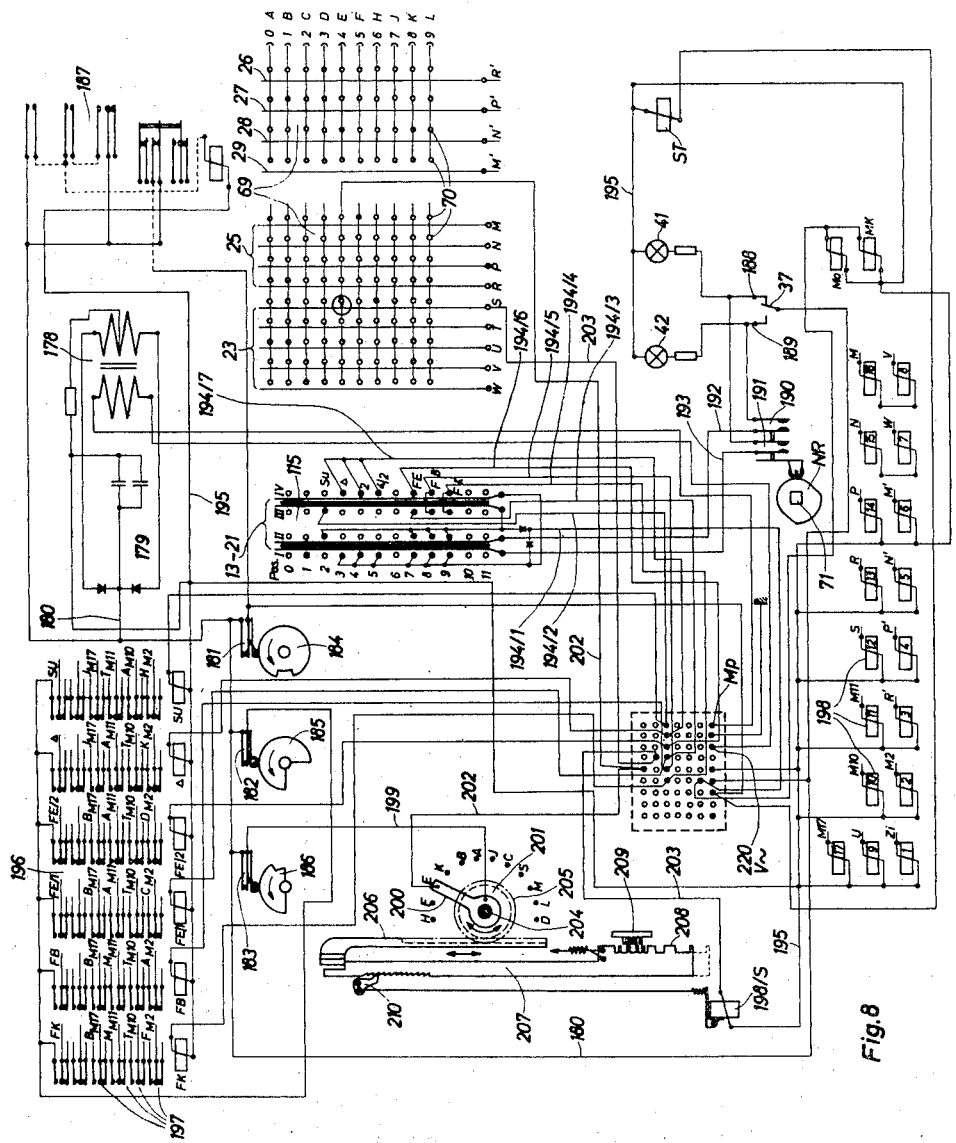
FIG. 8 is a circuit diagram for controlling the tape-perforating device of the apparatus of the invention.

The circuit illustrated in FIG. 8 operates as follows.

If in the course of a sales transaction of the key 23 relating to the position 4 (E) of the value position "S" is pressed and in connection therewith the control key 19 (Δ) is actuated, the accounting machine 4 executes an amount introduction machine run in which the differential mechanism 54 and 79 respectively transfer the contact arms 68 and 114 to the respective positions "Δ" and "E". If the programming switch 37 engages the contact 188, when the cam disc NR starts up, the contact pair 191 is closed and the switch relays Mo and MK are electrically energized through the conductor 193, the contact I/Δ, as well as the conductor 194/1, whereby the drive motor of the tape-perforating device 5 starts up and the single-revolution clutch is actuated. The switch relay 196/Δ is simultaneously energized through the conductor 194/7 (contact IV/Δ) whereby the magnets 198/M17, 198/M11 and 198/M12 are energized in the respective positions J, A, K. Since no key is actuated in the amount key row 23 (T), the magnet M2 in the value position zero (A) is energized.

The control cam 186 which has been started up closes the switch contact 183 so that the contact arm 200 extending over the contact 201/E of the current divider 201 supplies the current through the conductor 202, the closed contact 115/E of the rotary selector 115 and the conductor 203 to the magnets 198/S, which blocks the control rail 207 in the corresponding position so that in the subsequent perforating operation, the hole punchers 209 selected by the energized magnets are actuated.

The adjustment of the rotary selector 69 of the accounting machine 4 is effected during the amount or value introduction by means of the sensible keys 23 and 24 and as required (totalizing) by means of the adding mechanisms 60 to 63, the calculating wheels of which can be sensed through the intermediary of the differential mechanism 54.

When the program switch 37 connects the voltage-carrying conductor 180 with the contact 189 and the cam disc NR closes the contact pair 190, the conductor 192 is subjected to voltage. Since, however, the contact II/Δ has no connection with the contact path of the contact finger II, the tape-perforating device remains inoperative. It should also be noted that an especially constructed control rail 207 is coordinated with the magnet 198/Zi and marks a particular hole symbol "Zi" (see FIG. 9) on the perforated tape 6 for each perforating operation. The adjustment of the magnet 198/Zi is effected by means of the current distributor 201 through the contact "S" thereof.

As shown in FIGS. 9 to 13, upon the receipt of delivery of merchandise and before marking the price of a single article of merchandise on the perforated tape 6, the heading data is to be marked initially, then the voucher constants and thereafter the supplemental constants, and only then is the price marking to be effected. If one position of the supplier's invoice is marked, then the second third, fourth and so forth positions are marked in turn. The supplier's bill or invoice is ultimately inserted into the invoice-introducing device 43 (FIG. 2) and the sum calculated in the adding mechanism 60 is printed thereon. If a number of articles of the same merchandise is being pricemarked, instead of posting the individual marking values, the sum of all the individual marking values is marked on the perforated tape 6 (FIG. 10). In such a case, the program switch 27 must be suitably switched over or reversed. When a merchandise sale occurs, the heading data and the supplemental constants connected therewith must first be marked. For an individual sale (FIG. 11), the amount of the sale is marked and for multiple or large volume sales (FIG. 12), the sum of the individual sales amounts is marked. When merchandise is purchased (FIG. 13), the introduction of the heading data and the invoice constants takes place before marking the ordering of the merchandise. The heading data as well as the supplemental constants are also printed on the control or checking strips 44 which can be provided with automatically readable characters or indicia, if desired.

Figure 3:
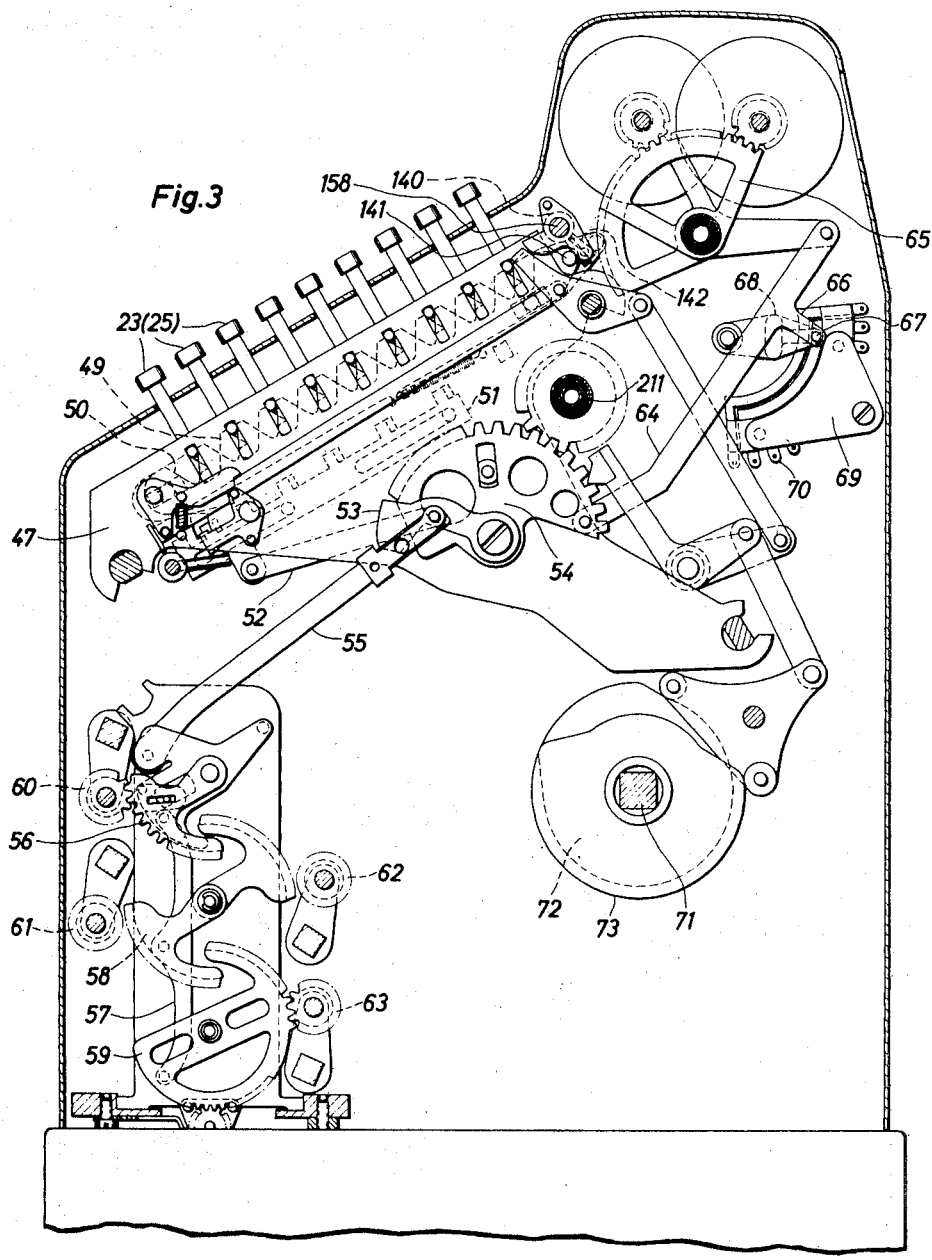
FIG. 3 is a cross-sectional view of the business machine of FIG. 2 showing a bank of amount keys.
Figure 4:
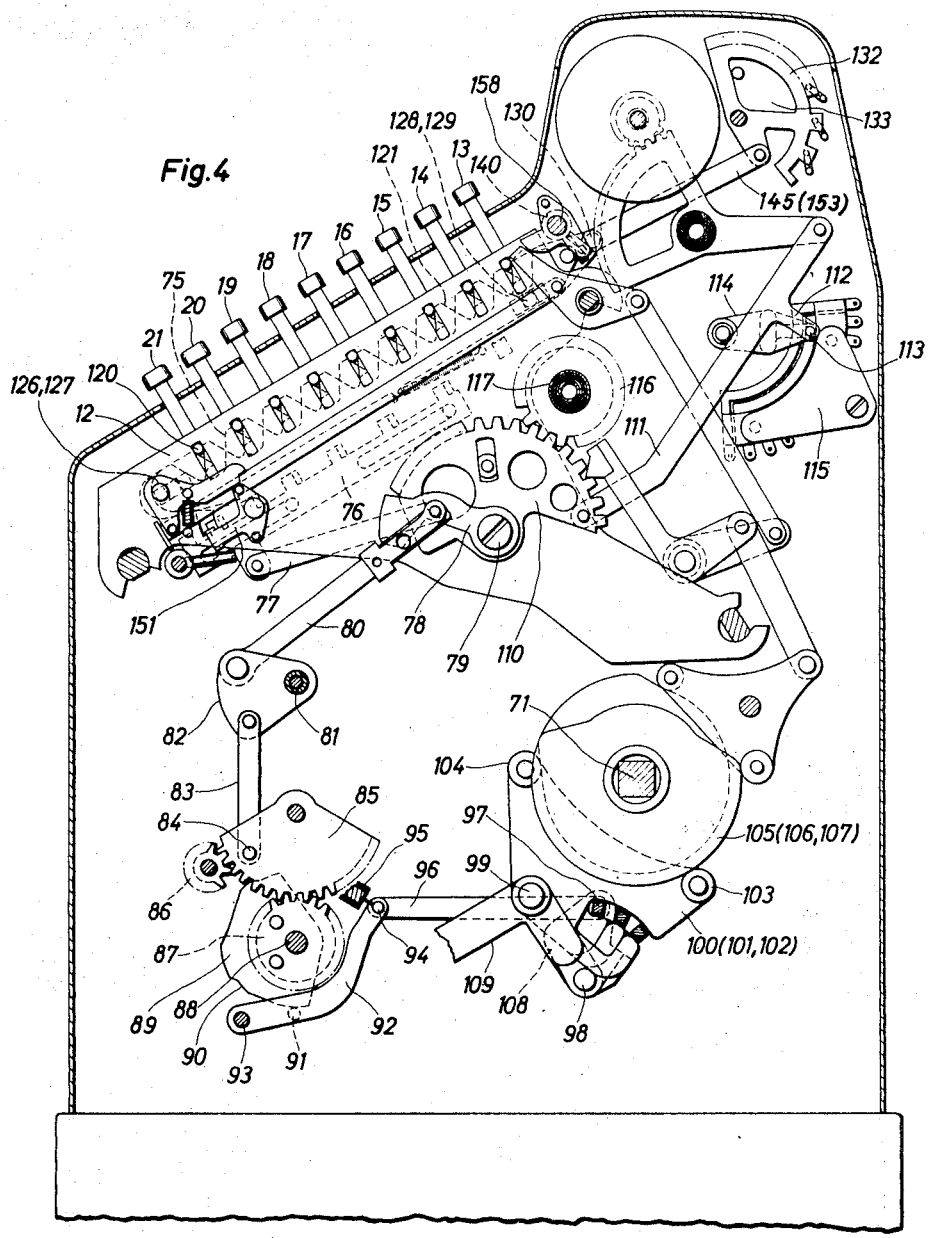
FIG. 4 is another cross-sectional view of the machine of FIG. 2 showing a bank of control keys.
Figure 5:
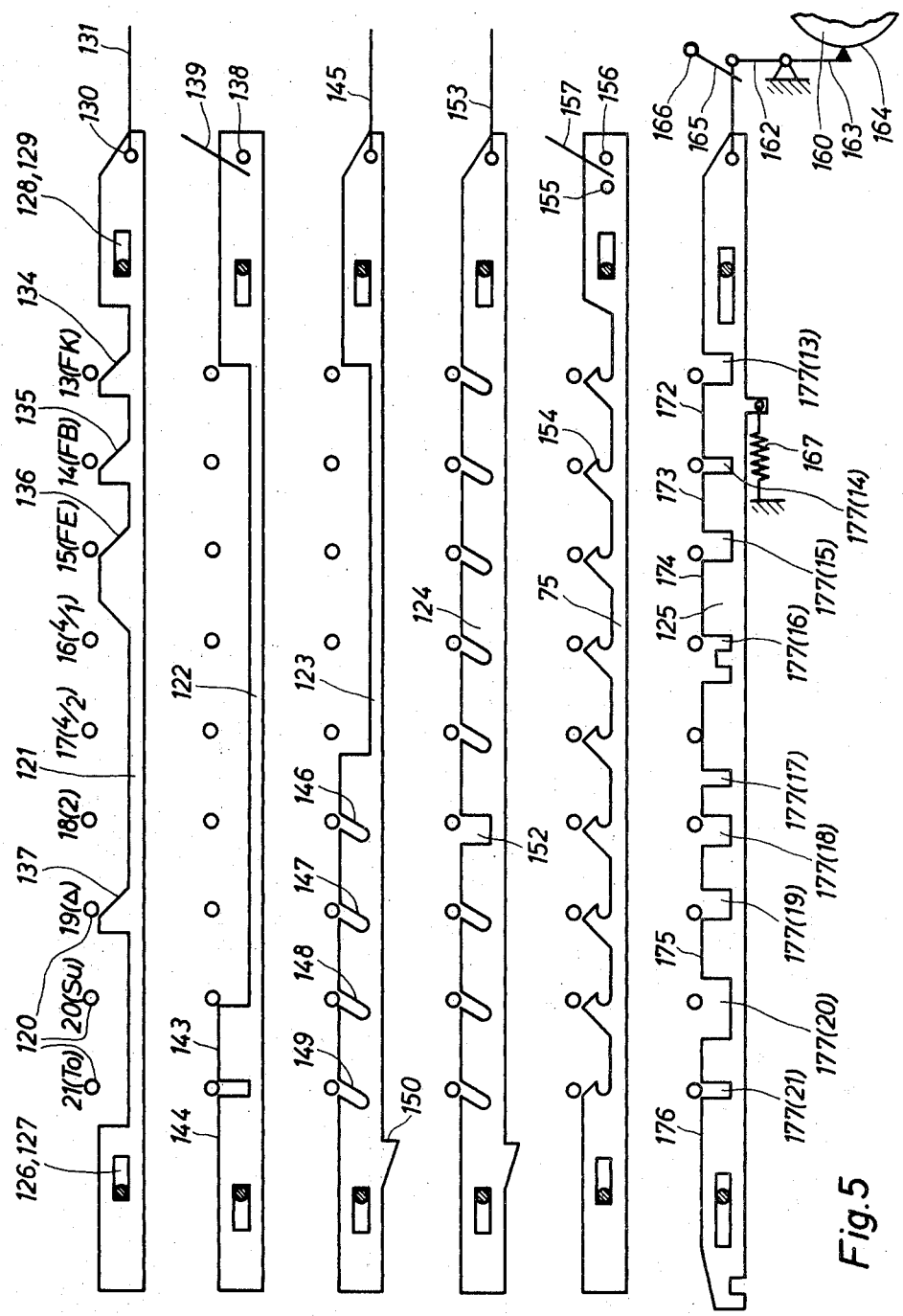
FIG. 5 is a schematic side view of key-blocking sliders constructed in accordance with the invention.

The device for producing the ticket or check and additional read-out sheets has the following construction:

As shown in FIGS. 3 and 4, the differential mechanisms 54 and 79 cooperate with tubular shafts 117 and 211 respectively which serve to adjust the printing type. In the printing mechanism 212 of the machine, the tubular shaft 211 (FIG. 6) carries a spur gear 213 meshing with three gears 214 to 216 of respective printing-type wheels 217 to 219, respectively. The type wheel 217 cooperates with a printing hammer 220 which is subject to the force of a spring 221 and is driven by the arm 222 of a double-armed lever 225 controlled by a cam 223 through a follower roller 224. The details of the printing-hammer controls are known as such, for example from U.S. Pat. No. 2,784,666, so that it suffices to describe in the following only those features that contribute to understanding the present invention. Another cam 226 is arranged on an axially displaceable drive shaft 227 beside the cam 223 and acts upon a follower 228 which actuates a spring-biased cliche-printing hammer 229 cooperating with a cliche 231 fastened in a trigger mechanism frame 230.

An inking tape 232 extends between the type wheels 217 and the cliche 231 on the one hand and the corresponding type-printing hammers 220 and the cliche-printing hammer 229, on the other hand. The inking tape 232 is guided by rollers 233, 234 and also by guide plates 235, 236 fastened to the mechanism frame 230, thus extending to a tape-feed stepping mechanism 240 of conventional design and operation.

Journalled on a shaft 241 is a roll of paper tape 242 from which the tape 243 passes over a fixed guiding plate or sheet 244 and between a transport roller or shaft 245, provided with conveyor pins 246, and a counter roller 247 beneath the type-wheels 217 and the cliche 231. Thence the tape passes through a severing and perforating device 248 of conventional construction and operation. For each machine run in which a double ticket or check is produced, a first printing of one portion of the ticket takes place, then the double ticket is advanced further past its dividing line and is again subjected to printing, but this time the second portion thereof is imprinted. Subsequently, the double ticket or check is severed and discharged. With quadruple tickets or checks, the control keys 16 and 17 are successively actuated so that in the first machine run, the first two portions of the ticket are printed and in the subsequent machine run, both of the last two portions are printed.

The type-wheel 218 copperates with a printing hammer 248 for producing imprints on a control or checking strip 44 (also see FIG. 2), which is supplied from a roll 252 journalled on a stationary shaft 251 and passes through a guide plate or sheet 253 and guide rollers 254, 255 to a take-up spool 256. The drive and control of the recording tape printer 257 are also known as such and therefore not further described herein.

The printing-type of the control or checking strip 44 and the ticket or check 250 can be of such construction that the characters or indicia produced thereby can be read from the printed sheets or cards through optical reading mechanisms.

Figure 2:
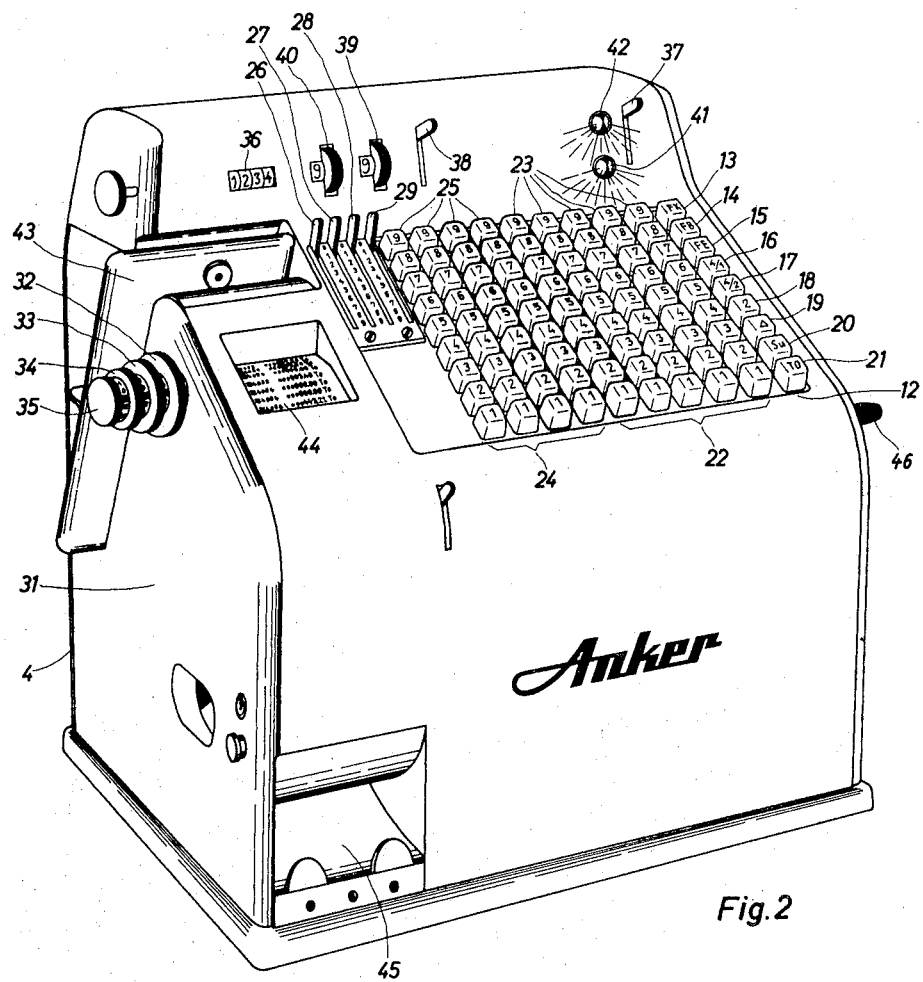
FIG. 2 is a perspective view of a business machine forming part of the apparatus of our invention.

If desired, the type-printing wheels 219 may also be employed for imprinting a voucher, single ticket or check or other paper or card that can be inserted into the machine by hand with the aid of a conventional guiding pocket 43 (FIG. 2).

Figure 14:
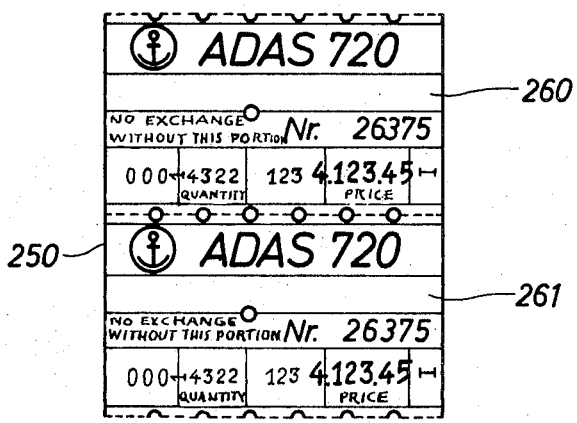
FIG. 14 is a view of a double ticket issued by the business machine of FIG. 2.
Figure 15:
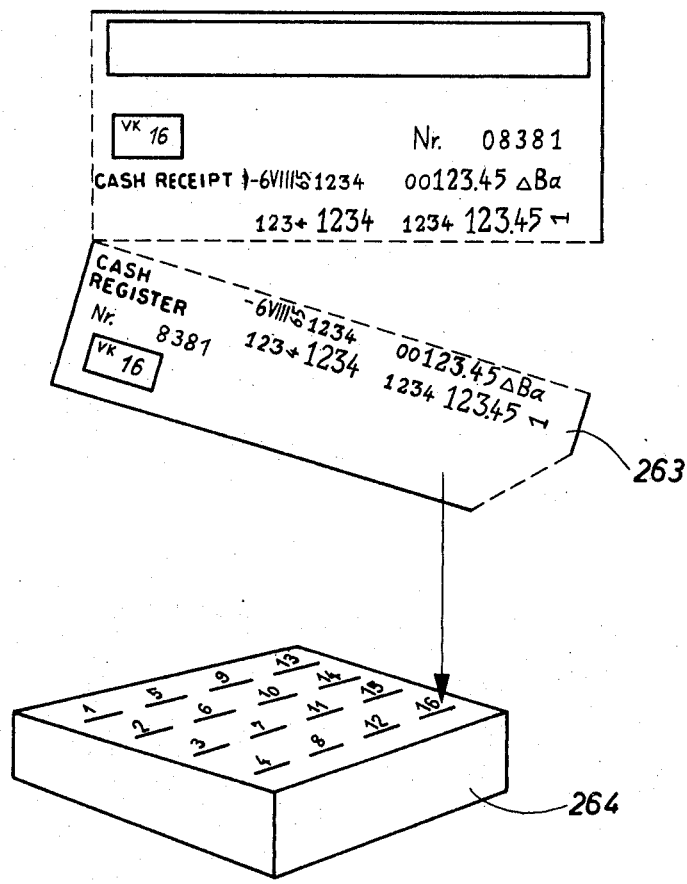
FIG. 15 is a diagrammatic view of a sorting device for presorting the ticket or check that is to be removed.

Located beneath the severing and perforating device 248 is an ejector opening 259 for the imprinted multiple ticket or check 250. The opening 259 widens toward the outside. Examples of the multiple ticket or check are shown in FIGS. 14 and 15.

The transport roller 245 advances the first portion 260 of the multiple ticket or check 250 which is to be issued during the printing operation in a conventional manner at first below the printing-type wheels 270, and subsequent thereto in the same machine run, the portion 261 is also passed under the type-wheels 270. Only after the end of the second printing operation is the ticket 250 severed from the strip and expelled. For the quadruple ticket, two machine runs are required which are released by the control keys 16 and 17.

For sales control, the ticket portions 263 (FIG. 15) receipted and discharged from the cash register 262 (FIG. 1) are presorted in a collecting box 264 and subsequently processed through the business machine 4. With the afore-described apparatus, the following business transactions can be handled with one and the same business machine 4:

1. Merchandise ordering or purchasing.

After introduction of the heading data and the invoice constants as shown in FIG. 13, in accordance with the order records, information regarding the deliveries, the article numbers and the order cost are inserted. As is seen from FIG. 13, the alphabetic symbol "G" and the alphabetic symbol "K" are respectively punched into the perforating tape 6 by the control key 13 (FK) and the control key 19 (Δ) respectively. A numerical comparison between the information on the order vouchers and the imprinted values of the control or checking strips 44 controls correct entry and therewith correct perforation in the hole punch tape. The individual deliveries are totalized in the adding mechanism 60 and the resulting sum is set out by actuating the control key 20 (SU).

2. Merchandise delivery or receipt with price marking.

In this business transaction, individual price markings (FIG. 9) or multiple price markings (FIG. 10) must be distinguished. For large-quantity price markings of the same merchandise, the advance counter 39, 40 is employed by being adjusted to the item count of the merchandise that is to be price-marked, initiating an automatically ending repreated price-marking operation. Upon reaching the zero position, i.e. after the entire number of items has been similarly price-marked, the advance counter 39, 40 shuts the business machine 4 off in a conventionally known manner. The control mechanism for carrying out the same machine runs sequentially is known and consequently need not be described in greater detail.

For individual price marking, each amount is marked on the perforated tape 6 whereas for the mass or multiple price marking only the entire amount, composed of the same individual amounts added together in the adding mechanism 60, is marked on the perforated band 6. As is apparent from FIG. 9, the tape comprises perforated regions each having seventeen positions of which the first "Zi", the eleventh "M" and the seventeenth "M" are marked as fixed values for each hole-punching operation. Thus, there remain fourteen positions for variable values which are adjusted by the control keys 13 to 21, the amount keys 23, the value keys 25 and the control levers 26 to 29 in the manner shown in FIGS. 9 to 13.

If one position of the supplier's invoices is marked at the marking operation, the second, the third and remaining positions are then marked sequentially. The supplier's bill or invoice is inserted finally in the conventional guiding pocket 43 (FIG. 2) of the business machine 4 and the sum stored in the adding mechanism 60 is imprinted thereon. The imprinted sum permits control or checking of the sum of the calculated selling price which is entered on the bill or invoice. The adding mechanism 61 can be suitably connected to take over all the price-marking information and by final totalizing actuated by the control key 21, the sum of the marked invoice information is determined.

For marking individual amounts with perforations, the program switch 37 is transferred to the lower position of FIG. 2 (contact 188 closed), in which the tape-perforating operation is carried out. Each individual marking is then perforated. At the totalizing operation, the perforating operation of the tape is switched off.

For mass or multiple marking with entry of the sum of the individual markings by perforations on the tape, the program switch is placed in its upper position as viewed in FIG. 2 (contact 189 closed). Accordingly, the perforating operation performed on the tape is discontinued for individual markings and is resumed for totalizing.

By means of these devices, the data evaluation and processing occur within economically justifiable limits.

3. For outgoing stock, i.e. for merchandise sales, the following operation can be performed with the apparatus:

The customer obtains the check or ticket shown in FIG. 15 when an article of merchandise is purchased by him and proceeds therewith to the cash register 262 in which both portions of the ticket are receipted. With the subsequently separated portion 263 (FIG. 15) and the cash register check, the customer goes to the packing table at which the merchandise is delivered to him and the ticket portion 263 is taken from him.

The portions 263 of the ticket are presorted and can subsequently be passed through the business machine 4. There is moreover also the possibility, particularly when using additional cash registers 262 which are set up for the sale of clearly distinguished groups of merchandise, to introduce a single sum determined in the respective cash register 262, i.e. a combination of all the individual sales prices of the items of merchandise in the particular group, into the business machine 4 to mark it accordingly on the perforated tape 6.

It is furthermore possible to process individual sales through the business machine 4 and to mark them on the perforated tape 6 in the manner shown in FIG. 11.

By suitable construction of the business machine 4, for example by adding additional control keys, the adding mechanisms 62 and 63 can also be employed for accommodating amounts which originate from the individual sales of the same type of merchandise.

With these individual sales, by means of the business machine 4, only the sum of the sold merchandise is then perforated into the hole-punch tape.

Figure 16:
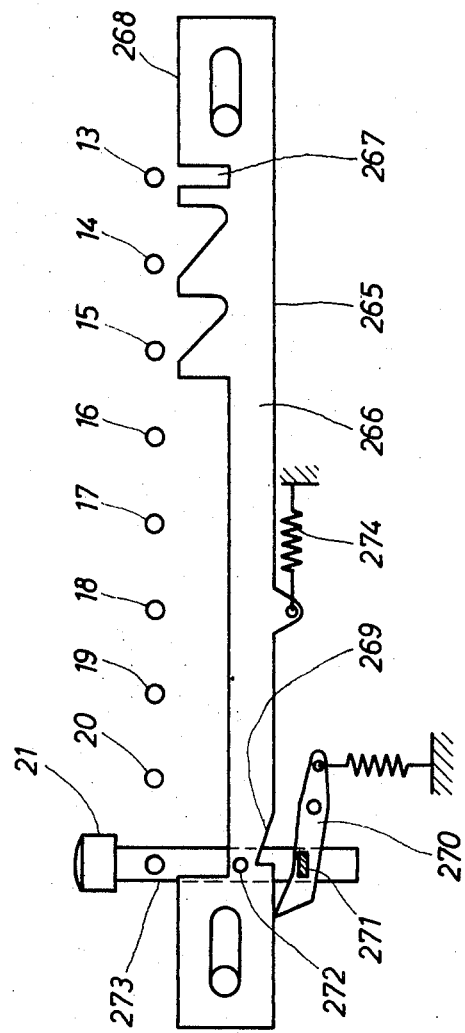
FIG. 16 is a side view of a blocking slider constructed in accordance with the invention.

To ensure at all events when marking the hole-punch tape 6 that, during the transition from one of the business transactions, i.e. merchandise purchasing, merchandise price-marking or merchandise sales, to one of the others, the due heading data will be introduced into the business machine 4 and perforated on the tape, an additional key block 265 shown in FIG. 16 can be provided for the control key 13, which can only be cleared by actuating the control key 21. As is evident from FIG. 16, the key block 265 has a blocking slider 266 which is displaceable toward the left-hand side of the figure by depressing the control keys 14 and 15. A small rectangular notch 267 is formed in the blocking slider 266, wherein the cross pin of the control key 13 can be received unimpeded in the normal position shown in FIG. 16. If the blocking slider 266 is shifted to the left-hand side of FIG. 16, however, the surface 268 prevents actuation of the control key 13. The control keys 16 to 20 have no effect on the blocking slider 266. At the left-hand lower portion of the blocking slider 266, a notch 269 is formed, which cooperates with a spring-loaded, fixedly mounted pawl 270. The pawl 270 is provided with an extension 271 on which a pin 272 of the control key shank 273 acts when the control key 21 is depressed. A tension spring 274 yieldingly holds the blocking slider 266 in the normal position shown in FIG. 16. The key block 265 thus ensures that the control key 13 can be reactuated only when a business transaction has been completely terminated. When, for example, as various merchandise entries are being marked, the specific adding mechanism 60 registering the merchandise entries is set at zero by means of the control key 20 and the totalizing mechanism 61 which registers all of the marked merchandise entries is transferred to its normal or starting position by means of the control key 21, the pin 272 of the control key 21 forces the pawl 270 out of the notch 269 as the control key 21 is depressed, and the blocking slider 266 returns to its original and normal position as shown in FIG. 16.

We claim:

1. Apparatus for producing an automatically processable data carrier marked with different groups of items of information relating to specific business transactions including merchandise purchasing, merchandise delivery with simultaneous marking of the price thereof, and merchandise selling, comprising a business machine having selectively operable bookeeping means for recording merchandise purchases, tag-marking means for marking merchandise tags, and cash register means for recording merchandise sales, and a data-marking device operatively connected thereto, said business machine having a control and adjustment mechanism for initially marking a data carrier, pursuant to one of said business transactions, with control data characters comprising heading data relating to the respective business transaction information group to be marked thereon, voucher constants relating to individual subgroups of the information group, and supplemental constants for differentiating the subgroups, and for thereafter marking the data carrier with numerical information relating to the respective business transaction, said control and adjustment mechanism comprising manually actuable adjusting members for introducing the numerical information correlated to the control data, comprising heading data, voucher constants and supplemental constants, into the business machine, and a plurality of control keys for releasing and controlling selective runs of the business machine for introducing said control data therein, the tag-marking means in the bookkeeping machine having mechanism actuable for selectively marking a single tag and a plurality of tags with information corresponding to the data marked on the data carrier, said business machine having switch means and said data-marking device having control means, said control means of said data-marking device being operatively connected with said switch means of said business machine and being actuable thereby to additionally mark on the data carrier alphabetic characters identifying respective groups of items of the numerical information, including optionally introducing a mark corresponding to an individual item of numerical information and a mark corresponding to a plurality thereof selectively.

2. Apparatus according to claim 1 wherein said control and adjustment mechanism of the business machine comprises control means for marking control information on the data carrier, control means for controlling different machine runs for marking single, double and quadruple checks, control means for controlling machine runs for introducing amounts, control means for totalizing, and control means for selectively switching the data-marking device to individual marking of business transactions and to the marking of sums determined for more than one of the same business transactions.

3. Apparatus according to claim 1 wherein said business machine has a keyboard including said control keys, amount keys and value keys, means for effecting various machine runs, and means operatively associated with several of said control keys for clearing said amount keys and value keys, others of said control keys being actuable at the termination of the respective completed machine runs for maintaining said amount keys and value keys in depressed position.

4. Apparatus for producing an automatically processable data carrier marked with different groups of items of information relating to specific business transactions including merchandise purchasing, merchandise delivery with simultaneous marking of the price thereof, and merchandise selling, comprising a business machine and a data-marking device operatively connected thereto, said business machine having a control and adjustment mechanism for initially marking a data carrier, pursuant to one of said business transactions, with control data characters comprising heading data relating to the respective business transaction information group to be marked thereon, voucher constants relating to individual subgroups of the information group, and supplemental constants for differentiating the subgroups, and for thereafter marking the data carrier with numerical information relating to the respective business transaction, said control and adjustment mechanism comprising manually actuable adjusting members for introducing the numerical information correlated to the control data, comprising heading data, voucher constant and supplemental constants, into the business machine, and a plurality of control keys for releasing and controlling selective runs of the business machine for introducing said control data therein, said business machine having switch means and said data-marking device having control means, said control means of said data-marking device being operatively connected with said switch means of said business machine so as to additionally identify alphabetically respective groups of items of information on the data carrier, said business machine having a bank of control keys, a multiple selector operatively connected with said bank of control keys, switch relay means, rotary selector means and magnet means, and said data-marking means having a current divider, said multiple selector means having contacts connected with said switch relay means, said switch relay means having contacts connected with said current divider, and said current divider having a contact connected with a setting of said rotary selector means, said contact connections determining the different switching times for said magnet means for the purpose of varying the marking of said control data.

* * * * *